United States Patent [19]

Oi et al.

[11] Patent Number: 4,963,254
[45] Date of Patent: Oct. 16, 1990

[54] PACKING MATERIAL FOR CHROMATOGRAPHIC USE

[75] Inventors: Naobumi Oi, Kyoto; Hajimu Kitahara; Tadashi Doi, both of Osaka, all of Japan

[73] Assignees: Sumitomo Chemical Company, Limited; Sumika Chemical Analysis Service, both of Osaka, Japan

[21] Appl. No.: 218,788

[22] Filed: Jul. 14, 1988

[30] Foreign Application Priority Data

Jul. 15, 1987 [JP] Japan .................................. 62-177983

[51] Int. Cl.$^5$ .............................................. B01D 15/08
[52] U.S. Cl. ............................... 210/198.2; 210/502.1; 502/401
[58] Field of Search ...................... 210/635, 656, 198.2, 210/502.1; 502/401

[56] References Cited

U.S. PATENT DOCUMENTS

| | | | |
|---|---|---|---|
| 3,960,720 | 6/1976 | Porath | 502/401 |
| 4,322,310 | 3/1982 | House | 210/635 |
| 4,324,681 | 4/1982 | House | 502/401 |
| 4,330,440 | 5/1982 | Ayers | 210/635 |
| 4,421,650 | 12/1983 | Nagasawa | 210/635 |
| 4,512,898 | 4/1985 | Oi | 210/656 |
| 4,522,724 | 6/1985 | Ramsden | 210/635 |
| 4,523,997 | 6/1985 | Crane | 210/635 |
| 4,565,877 | 1/1986 | Wade | 210/656 |
| 4,604,207 | 8/1986 | Oi | 210/635 |

OTHER PUBLICATIONS

Pirkle, "Chirdal High Pressure Liquid Chromatographic Stationary Phases" J. Org. Chem., vol. 44, No. 12, 1979, pp. 1957-1960.
Pirkle, "Synthesis and Enantiomeric Purity Determination" J. Org. Chem., vol. 44, No. 7, 1979, pp. 1025-1028.
Pirkle, "Broad-Spectrum Synthesis" J. Org. Chem. vol. 44, No. 13, 1979, pp. 2169-2175.
Pirkle, "Dynamic NMR Studies" J. Org. Chem. vol. 44, No. 26, 1979, pp. 4891-4896.
Pirkle, Resolution of Optical Isomers by Liquid Chromatography, Journal of Chromatography, vol. 123, (1976), pp. 400-404.
Davankov et al., J. Chromatogr., 141, (1977), pp. 313-353, "Ligand-Exchange Chromatography".
Mikes et al., J. Chromtogr., 122, (1976), pp. 205-221, "Resolution of Optical Isomers".
Hara et al., J. Liquid Chromatogr., 2, (1979), pp. 883-889, "Separation of Racemic α-Amino Acid Derivatives".
Hara et al., J. Chromatogr. 186, (1979), pp. 543-552, "Retention of Optically Active & Amino Acid Derivatives".

Primary Examiner—Ernest G. Therkorn
Attorney, Agent, or Firm—Sughrue, Mion, Zinn, Macpeak & Seas

[57] ABSTRACT

A packing material for chromatographic use wherein an organosilane of formula (I):

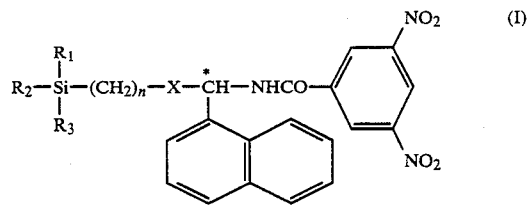

wherein $R_1$, $R_2$ and $R_3$, which may be the same or different, each represents an alkyl, alkoxy or hydroxyl group or a halogen atom, provided that at least one of them represents an alkoxy group or a halogen atom; X represents an —NHCO— or —$NH_3{}^{\pm}$—OCO— group; n is an integer of 2 to 4; and *C represents an asymmetric carbon atom, is grafted on an inorganic carrier having hydroxyl groups on the surface thereof as well as a method for the analysis of an enantiomer mixture using the same are disclosed.

1 Claim, 1 Drawing Sheet

PACKING MATERIAL FOR CHROMATOGRAPHIC USE

FIELD OF THE INVENTION

This invention relates to a packing material for chromatographic use and a liquid chromatographic method using the same.

BACKGROUND OF THE INVENTION

Known methods for separating and analyzing an enantiomer mixture of compounds containing an asymmetric carbon atom through liquid chromatography by using an optically active compound-grafted packing material include a ligand exchange method reported by V. Davankov et al. wherein an optically active proline-grafted packing material is employed (cf. J. Chromatogr., 141, 313 (1977)); a charge transfer complex method reported by F. Mikes et al. wherein a $\pi$-electron-lacking, optically active compound-grafted packing material is employed (cf. J. Chromatogr., 122, 205 (1976)); a method for separation of N-acylated amino acid esters or N-acylated dipeptide esters using an optically active N-acylated amino acid-grafted packing material as reported by Hara et al. (cf. J. Liquid Chromatogr., 2, 883 (1979) and J. Chromatogr., 186, 543 (1979)); and a method for separation of 3,5-dinitrobenzoylated amino acids, amines, hydroxy acids or sulfoxides using an optically active 1-(9-anthryl)-trifluoroethanol-grafted packing material as well as a method for separation of aromatic alcohols using a 3,5-dinitrobenzoylated, optically active phenylglycine-grafted packing material as reported by W. Pirkle et al. (cf. J. Org. Chem., 44, 1957 (1979)).

However there is no effective packing material for directly separating and analyzing an enantiomer mixture of, for example, an ester or an alcohol, except those reported by W. Pirkle et al. Further there are a number of enantiomer mixtures which cannot be separated even by the Pirkle's method. In addition, the separation of an enantiomer mixture by this method would be sometimes insufficient. Thus the Pirkle's method can be applied to only limited cases. Accordingly it has been keenly required to develop a novel packing material of an improved performance to thereby overcome the above problems.

SUMMARY OF THE INVENTION

The inventors have conducted studies in order to develop a packing material which is widely applicable in analyzing enantiomer mixtures of, for example, esters or alcohols and has an improved performance. As a result, it has been found that a packing material for chromatographic use obtained by grafting an organosilane of formula (I):

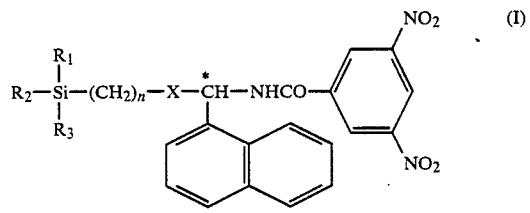

wherein $R_1$, $R_2$ and $R_3$, which may be the same or different, each represents an alkyl, alkoxy or hydroxyl group or a halogen atom, provided that at least one of them represents an alkoxy group or a halogen atom; X represents an $-NHCO-$ or $-NH_3^{\pm}OCO-$ group; n is an integer of 2 to 4; and *C represents an asymmetric carbon atom, on an inorganic carrier having hydroxyl groups on the surface thereof is highly useful since it exhibits an improve effect on the separation of an enantiomer mixture of compounds containing an $-OH$ or $-OCO-$ group bonded to an asymmetric carbon, compared with those employed in the Pirkle's method as described above, thus completing the present invention.

BRIEF DESCRIPTION OF THE DRAWINGS

In FIG. 1, the time of elution of the peak (3) required is approximately 30 minutes and the separation factor thereof is 1.13, while the peak area ratio of the peaks (2) to (3) is 50:50.

DETAILED DESCRIPTION OF THE INVENTION

Figure 2:
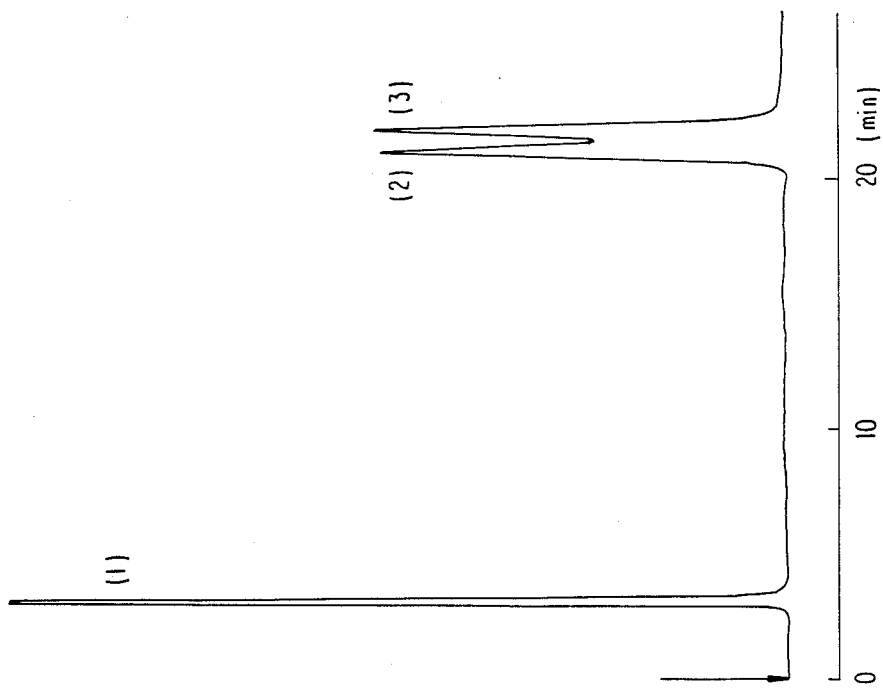
FIGS. 1 and 2 are chromatograms of (RS)-3-allyl-2-methyl-4-oxo-2-cyclopentenyl 2,2,3,3-tetramethylcyclopropanecarboxylate as obtained in Example 1 and Comparative Example 1, respectively. In each figure, (1) corresponds to a peak of chloroform used as the solvent; (2) corresponds to a peak of (S)-3-allyl-2-methyl-4-oxo-2-cyclopentenyl 2,2,3,3-tetramethylcyclopropanecarboxylate; and (3) corresponds to a peak of (R)-3-allyl-2-methyl-4-oxo-2-cyclopentenyl 2,2,3,3-tetramethylcyclopropanecarboxylate.

In formula (I), X may be either an $-NHCO-$ group or an $-NH_3^{\pm}OCO-$ group. Thus it can be arbitrarily selected depending on the purpose and usage.

As the aminoalkylsilane component, an $\omega$-aminoalkylalkoxysilane and an $\omega$-aminoalkylhalogenosilane are preferable. Examples thereof include $\omega$-aminopropyltriethoxysilane and $\omega$-aminopropyltrichlorosilane.

Examples of the inorganic carrier having hydroxyl groups on the surface thereof to be used in the present invention include silica-containing carriers such as silica gel. Although the carrier may be in any form, for example, spherical or ground, it is preferably in the form of fine grains having as uniform particle size as possible in order to give a chromatographic column of a high performance.

In the preparation of the packing material of the present invention, various grafting methods may be employed. For example, the grafting may be carried out by reacting an inorganic carrier having hydroxyl groups on the surface thereof with an aminoalkylsilane to thereby introduce aminoalkylsilyl residues onto the surface of the inorganic carrier; and then treating the same with 3,5-dinitrobenzoylated, optically active ($\alpha$-naphthyl)glycine to thereby induce dehydration/condensation or ionically bonding.

More particularly, an inorganic carrier having hydroxyl groups on the surface thereof is treated with an aminoalkylsilane of formula (II):

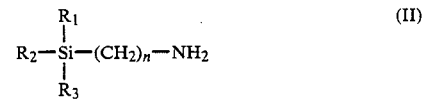

wherein $R_1$, $R_2$, $R_3$ and n are as defined above, by a known method to thereby introduce aminoalkylsilyl residues onto the surface of the inorganic carrier; and then treating the same with N-3,5-dinitrobenzoyl-(R) or (S)-(α-naphthyl)glycine of the formula (III):

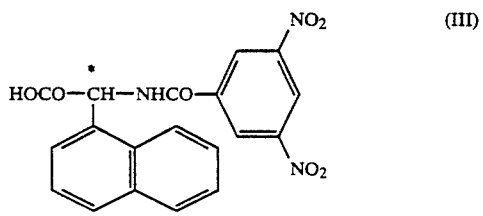

to thereby induce dehydration/condensation or ionically bonding. Thus the aimed packing material can be obtained.

The N-3,5-dinitrobenzoyl-(R) or (S)-(α-naphthyl)-glycine of formula (III) may be prepared in a common method. For example, commercially available α-naphthylacetonitrile is treated with hydrogen chloride in methanol to thereby give methyl(α-naphthyl)acetoimidate. Then the resulting product is treated with sodium hypochlorite and sodium methylate to give (α-naphthyl)glycine methyl ester. Then this product is treated with 3,5-dinitrobenzoyl chloride. The N-3,5-dinitrobenzoyl-(RS)-(α-naphthyl)glycine methyl ester thus obtained is hydrolyzed to thereby give N-3,5-dinitrobenzoyl-(RS)-(α-naphthyl)glycine which is then optically resolved. Thus the aimed compound can be obtained.

The packing material containing optically active N-3,5-dinitrobenzoyl-(α-naphthyl)glycine residues as obtained according to the present invention may be packed in a chromatographic column in a conventional manner and used as a stationary phase in liquid chromatography. An enantiomer mixture of compounds containing an —OH or —OCO— group bonded to an asymmetric carbon can be efficiently separated and analyzed within a short period of time through liquid chromatography wherein the above-mentioned stationary phase is used under appropriately selected conditions.

To further illustrate the present invention, and not by way of limitation, the following Examples will be given.

EXAMPLE 1

10 g of silica gel (average particle size: 5 μm, average pore size: 60 Å, surface area: 500 m²/g) was dried at 130° C. under reduced pressure for four hours and then added to 20 g of 3-aminopropyltriethoxysilane dissolved in 200 ml of dry toluene. The resulting mixture was stirred at 60° C. for six hours. Then the reaction product was filtered, washed with 200 ml of acetone and dried. Thus 3-aminopropylsilylated silica gel, which will be abbreviated as APS hereinafter, was obtained. The elemental analysis of this product showed N: 1.20% and C: 3.40%, which suggests that approximately 0.90 mmol of the 3-aminopropyl group was grafted per g of APS.

Separately, 112.2 g of α-naphthylacetonitrile and 26.7 g of methanol were stirred together at 35° C., thus dissolving the former in the latter. Then hydrogen chloride gas was introduced into the obtained solution at room temperature until white crystals were formed and solidified. 200 ml of diethyl ether was added thereto and the resulting mixture was thoroughly stirred and filtered. The powder thus obtained was dried under reduced pressure to thereby give 62.6 g of crude methyl-(α-naphthyl)acetoimidate hydrochloride. To 30 g of this product, 1064 g of a 10.5% aqueous solution of sodium hypochlorite was added by portions under ice-cooling. 140 ml of benzene was further added thereto and the resulting mixture was stirred for 30 minutes. After filtering the reaction mixture, the filtrate was fractionated and the benzene phases were combined. The aqueous phase was extracted by 160 ml of benzene under shaking and the benzene phase thus obtained was combined with the above-mentioned ones. Then the benzene phase was dried by adding 50 g of magnesium sulfate thereto and filtered. The filtrate was concentrated at 50° C. under reduced pressure. The residue was dissolved in 110 ml of benzene and introduced into a dropping funnel. Then this solution was added dropwise to a solution which had previously been prepared by dissolving 26.9 g of a 28% methanol solution of sodium methylate in 73 ml of dry methanol and the resulting mixture was stirred for 30 minutes under ice-cooling and then for two hours at room temperature. Subsequently 147 ml of 2N hydrochloric acid was added thereto. The lower aqueous phase was collected while 40 ml of 2N hydrochloric acid was added to the upper phase which was then further extracted. The collected aqueous phase was combined with the above-mentioned aqueous phase and concentrated at 45° C. under reduced pressure. 100 ml of 2N hydrochloric acid and 50 ml of methanol were added to the residue and the mixture was heated under reflux for one hour. Then 200 ml of water was added thereto and the mixture was thoroughly stirred. The aqueous phase was collected, and 5 g of active carbon was added thereto, followed by filtering the mixture. 100 ml of ethanol was added to the filtrate and the mixture was filtered. The filtrate was concentrated at 50° C. under reduced pressure and the residue was dissolved in 100 ml of ethanol. After filtering off the insoluble materials, the filtrate was concentrated at 50° C. under reduced pressure. The residue was dried under reduced pressure to thereby give 5.9 g of (RS)-(α-naphthyl)glycine methyl ester hydrochloride. This product was suspended in 80 ml of dry tetrahydrofuran and 5.8 g of 3,5-dinitrobenzoyl chloride was added thereto under stirring. Then N-methylmorpholine was added thereto by portions until no white fume was observed any more. The resulting mixture was stirred over day and night and then filtered. The filtrate was concentrated at 50° C. under reduced pressure to thereby give 11 g of N-3,5-dinitrobenzoyl-(RS)-(α-naphthyl)glycine methyl ester. To the ester thus obtained, 50 ml of methanol and 70 ml of tetrahydrofuran were added. 150 ml of a 1N aqueous solution of sodium hydroxide was further added thereto and the obtained mixture was stirred at room temperature for two hours and then concentrated at room temperature under reduced pressure. 200 ml of water and 200 ml of chloroform were added to the residue to thereby extract the same under shaking. The aqueous phase was collected and the pH value of the same was adjusted to 3 by adding 6N hydrochloric acid. Then it was extracted with 300 ml of ethyl acetate under shaking and the ethyl acetate phase was collected. The ethyl acetate phase was dried by adding 50 g of anhydrous sodium sulfate thereto and filtered. The filtrate was concentrated at 50° C. under reduced pressure to thereby give 10 g of N-3,5-dinitrobenzoyl-(RS)-(α-naphthyl)glycine. 5 g of this product was recrystallized from 5 ml of methanol and 20 ml of chloroform. The crystals were filtered and dried under reduced pressure to thereby give 2.1 g of purified N-3,5-dinitrobenzoyl-(RS)-(o-naphthyl)glycine. This product was dissolved in 5 ml of methanol and injected into a stainless steel-made high-performance liquid chromatography column of 8 mm in inner diameter and 25 cm in length, in which a packing material obtained by chemically bonding N-(S)-1-(α-naphthyl)ethylaminocarbonyl-L-valine to APS was packed, to thereby optically resolve the product. The obtained fractions were concentrated under reduced pressure to thereby give 0.72 g of N-3,5-dinitrobenzoyl-(R)-(α-naphthyl)glycine.

m.p. (decomp.): 138.3° C.
Optical rotation: $[\alpha]_D^{20} = -98.5°$
(c=1.00%, tetrahydrofuran).

| Elemental analysis: | C (%) | H (%) | N (%) |
|---|---|---|---|
| calcd. as $C_{19}H_{13}N_3O_7$ | 57.73 | 3.31 | 10.63 |
| found | 56.81 | 3.71 | 10.18 |

Figure 1:
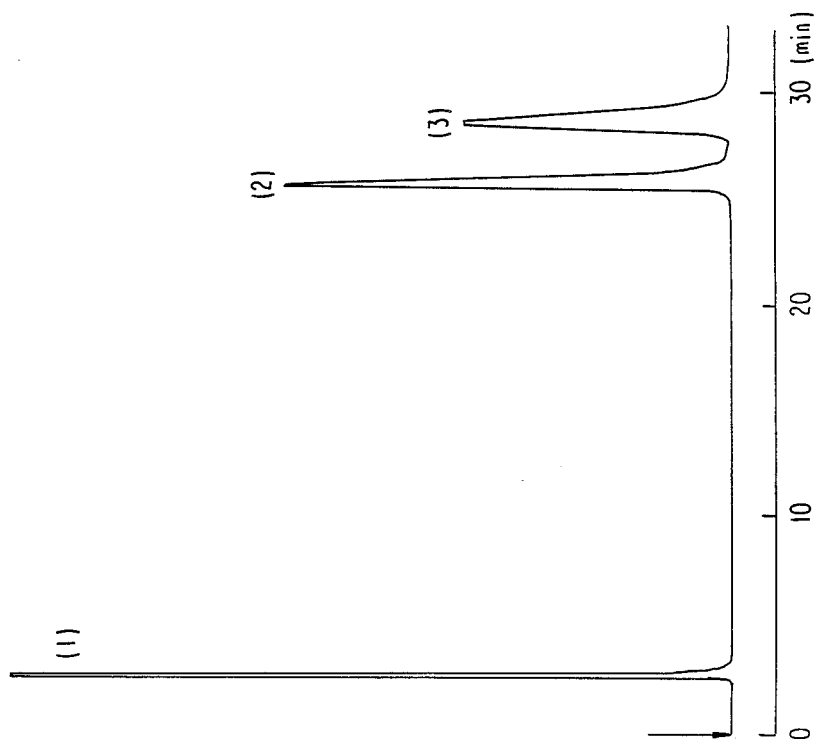

0.7 g of the compound as obtained above was dissolved in 10 ml of dry tetrahydrofuran and 1.7 g of APS was suspended in the resulting solution. After sufficiently degassed under reduced pressure, the suspension was slowly stirred at room temperature over day and night. The reaction product was washed with 50 ml of tetrahydrofuran, 100 ml of methanol, 100 ml of chloroform and 50 ml of diethyl ether and dried. Thus the aimed N-3,5-dinitrobenzoyl-(R)-(α-naphthyl)glycine-grafted packing material, which will be abbreviated as DNB-NGL-Si hereinafter, was obtained. The elemental analysis of this product showed N: 2.28% and C: 8.14%, which suggests that approximately 0.35 mmole of the N-3,5-dinitrobenzoyl-(R)-(α-naphthyl)glycine was grafted per g of the packing material. The packing material thus obtained was packed as a slurry in a stainless steel-made column of 4 mm in inner diameter and 25 cm in length. The (RS)-3-allyl-2-methyl-4-oxo-2-cyclopentenyl 2,2,3,3-tetramethylcyclopropanecarboxylate was analyzed therewith under the following conditions. FIG. 1 shows the chromatogram thus obtained.

Temperature: room temperature.
Mobile phase: hexane/1,2-dichloroethane/ethanol 500:30:0.15).
Flow rate: 1.0 ml/min.
Detector: UV photometer (wavelength: 230 nm).

COMPARATIVE EXAMPLE 1

10 g of (R)-phenylglycine was suspended in 120 ml of dry tetrahydrofuran. To the resulting suspension, 15 g of 3,5-dinitrobenzoylchloride was added at room temperature while stirring. The obtained mixture was further stirred at room temperature for an additional ten days. The reaction mixture was filtered and the filtrate was concentrated at 40° C. under reduced pressure. The residue was dissolved in 150 ml of a 5% aqueous solution of sodium hydrogencarbonate and 60 ml of ethyl acetate was further added thereto. After shaking and washing the mixture, the aqueous phase was collected and the pH value thereof was adjusted to 4 by adding 6N hydrochloric acid thereto. The crystals thus formed were filtered, washed with 100 ml portions of water thrice and recrystallized from 160 ml of methanol. Thus 10 g of N-3,5-dinitrobenzoyl-(R)-phenylglycine was obtained.

m.p. (decomp.): 216.8° C.
Optical rotation: $[\alpha]_D^{20} = -101.5°$
(c=1.10%, tetrahydrofuran).

| Elemental analysis: | C (%) | H (%) | N (%) |
|---|---|---|---|
| calcd. as $C_{15}H_{11}N_3O_7$ | 52.18 | 3.21 | 12.17 |
| found | 52.01 | 3.36 | 12.29 |

2 g of the compound thus obtained was dissolved in 30 ml of dry tetrahydrofuran. To the resulting solution, 2.0 g of the APS as prepared in Example 1 was added and the mixture was treated in the same manner as in Example 1. Thus a so-called Pirkle's packing material on which N-3,5-dinitrobenzoyl-(R)-phenylglycine was grafted, which will be abbreviated as DNB-PHG-Si hereinafter, was obtained. The elemental analysis of this material showed N: 2.93% and C: 10.07%, which suggests that approximately 0.50 mmol of the N-3,5-dinitrobenzoyl-(R)-phenylglycine was grafted per g of the packing material. Then (RS)-3-allyl-2-methyl-4-oxo-2-cyclopentenyl 2,2,3,3-tetramethylcyclopropanecarboxylate was analyzed with the use of the packing material under the same conditions as defined in Example 1. FIG. 2 shows the chromatogram thus obtained.

In FIG. 2, peaks (2) and (3) almost superpose each other, which suggests that the packing material of Example 1 is superior to that of Comparative Example 1 in capability of resolving the enantiomers of (RS)-3-allyl-2-methyl-4-oxo-2-cyclopentenyl 2,2,3,3-tetramethylcyclopropanecarboxylate.

EXAMPLES 2 TO 14 AND COMPARATIVE EXAMPLES 2 TO 14

Enantiomer mixtures of various esters and alcohols were analyzed by using the packing materials DNB-NPG-Si and DNB-PHG-Si, as prepared in Example 1 and Comparative Example 1, respectively, under the same conditions as defined in Example 1 except that another UV photometer (wavelength: 254 nm) and mobile phases as shown in Table 1 were employed.

Table 1 summarizes the results of Examples 1 to 14 and Comparative Examples 1 to 14.

TABLE 1

| | | | | Capacity Factor(κ') | | |
|---|---|---|---|---|---|---|
| No. | Analyzed compound | Packing material | Mobile* phase | First peak | Second peak | Separation factor (α) |
| 1 | (RS)-3-allyl-2-methyl-4-oxo-2-cyclopentenyl 2,2-3,3-tetramethylcyclopropanecarboxylate | DNB-NPG-Si | A | 8.89 | 10.05 | 1.13 |
| | | DNB-PHG-Si | A | 6.25 | 6.54 | 1.05 |
| 2 | (RS)-α-cyano-3-phenoxybenzyl 2,2,3,3-tetramethylcyclopropanecarboxylate | DNB-NPG-Si | A | 4.48 | 4.86 | 1.08 |
| | | DNB-PHG-Si | A | 4.72 | 4.85 | 1.03 |
| 3 | 3,4,5,6-tetraphthalimide-methyl (1RS)-cis-chrysanthemate | DNB-NPG-Si | A | 18.56 | 20.60 | 1.11* |
| | | DNB-PHG-Si | A | 11.58 | 12.19 | 1.05 |

TABLE 1-continued

| No. | Analyzed compound | Packing material | Mobile* phase | Capacity Factor(κ') First peak | Capacity Factor(κ') Second peak | Separation factor (α) |
|---|---|---|---|---|---|---|
| 4 | 3-phenoxybenzyl (1RS)-cis-chrysanthemate | DNB-NPG-Si | B | 3.60 | 4.01 | 1.11 |
|  |  | DNB-PHG-Si | B | 6.85 | 7.15 | 1.04 |
| 5 | 3-phenoxybenzyl (1RS)-trans-chrysanthemate | DNB-NPG-Si | B | 4.43 | 4.74 | 1.07 |
|  |  | DNB-PHG-Si | B | 7.98 | 8.27 | 1.04 |
| 6 | 5-benzyl-3-furylmethyl (1RS)-cis-chrysanthemate | DNB-NPG-Si | B | 3.74 | 4.34 | 1.16 |
|  |  | DNB-PHG-Si | B | 7.50 | 7.88 | 1.05 |
| 7 | 5-benzyl-3-furylmethyl (1RS)-trans-chrysanthemate | DNB-NPG-Si | B | 4.57 | 4.97 | 1.09 |
|  |  | DNB-PHG-Si | B | 8.58 | 8.99 | 1.05 |
| 8 | 3-phenoxybenzyl (1RS)-cis-3-(2,2-dichlorovinyl)-2,2-dimethylcyclopropanecarboxylate | DNB-NPG-Si | B | 3.36 | 3.86 | 1.15 |
|  |  | DNB-PHG-Si | B | 5.33 | 5.60 | 1.05 |
| 9 | α-phenylbenzyl (RS)-2-(4-chlorophenyl)-3-methyl-butanoate | DNB-NPG-Si | C | 6.25 | 7.42 | 1.19 |
|  |  | DNB-PHG-Si | C | 5.00 | 5.30 | 1.06 |
| 10 | (±)-(2,4-dichlorophenyl)-4,4-dimethyl-2-(1,2,4-triazol-1-yl)-1-penten-3-ol | DNB-NPG-Si | D | 3.98 | 4.54 | 1.14 |
|  |  | DNB-PHG-Si | D | 3.78 | 3.78 | 1.00 |
| 11 | (±)-(4-chlorophenyl)-4,4-dimethyl-2-(1,2,4-triazol-1-yl)-1-penten-3-ol | DNB-NPG-Si | D | 5.75 | 6.27 | 1.09 |
|  |  | DNB-PHG-Si | D | 5.57 | 5.57 | 1.00 |
| 12 | (±)-1-phenylethanol | DNB-NPG-Si | D | 1.59 | 1.69 | 1.06 |
|  |  | DNB-PHG-Si | D | 1.61 | 1.61 | 1.00 |
| 13 | (±)-1-naphthylethanol | DNB-NPG-Si | D | 3.28 | 3.54 | 1.08 |
|  |  | DNB-PHG-Si | D | 3.06 | 3.15 | 1.03 |
| 14 | (±)-2-hydroxy-2-phenylacetophenone [(±)-benzoine] | DNB-NPG-Si | D | 3.40 | 3.74 | 1.10 |
|  |  | DNB-PHG-Si | D | 2.71 | 2.82 | 1.04 |

*A: n-hexane/1,2-dichloroethane/ethanol (500:30:0.15)
B: n-hexane/1,2-dichloroethane (500:1)
C: n-hexane/1,2-dichloroethane (99:1)
D: n-hexane/1,2-dichloroethane/ethanol (100:20:1)

Generally speaking, the packing material DNB-NPG-Si according to the present invention exhibits larger separation factors than the comparative packing material DNB-PHG-Si does, indicating that the former is superior to the latter in capacity of resolving enantiomers.

As described above, an enantiomer mixture of compounds containing an —OH or —OCO— group bonded to an asymmetric carbon can be efficiently separated and analyzed within a short period of time through liquid chromatography by using the packing material of the present invention having optically active N-3,5-dinitrobenzoyl-(α-naphthyl)glycine residues and appropriately selecting elution conditions.

While the invention has been described in detail and with reference to specific embodiments thereof, it will be apparent to one skilled in the art that various changes and modifications can be made therein without departing from the spirit and scope thereof.

What is claimed is:

1. A chromatographic column comprising a column packed with a packing material sized and dimensioned for chromatographic use, said packing material comprising an inorganic carrier having hydroxyl groups on the surface thereof, having grafted thereon an organosilane of formula (I):

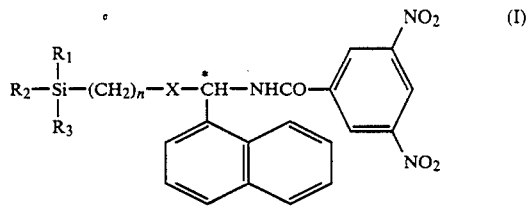

wherein $R_1$, $R_2$ and $R_3$, which may be the same or different, each represents an alkyl, alkoxy or hydroxyl group or a halogen atom, provided that at least one of them represents an alkoxy group or a halogen atom; X represents an —NHCO— or —NH$_3^\pm$OCO— group; n is an integer of 2 to 4; and *C represents an asymmetric carbon atom.

* * * * *